United States Patent
Hoffman et al.

(10) Patent No.: US 9,028,324 B1
(45) Date of Patent: *May 12, 2015

(54) METHOD AND APPARATUS FOR PROMOTING DESIRED ON-LINE ACTIVITIES USING ON-LINE GAMES

(71) Applicant: Hyperlayers, Inc., San Francisco, CA (US)

(72) Inventors: Steven Samuel Hoffman, San Francisco, CA (US); Naomi Kokubo, San Francisco, CA (US)

(73) Assignee: Lavamind LLC, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/965,589

(22) Filed: Aug. 13, 2013

Related U.S. Application Data

(63) Continuation of application No. 13/567,000, filed on Aug. 3, 2012, now Pat. No. 8,510,413, which is a continuation of application No. 12/111,916, filed on Apr. 29, 2008, now Pat. No. 8,239,487.

(60) Provisional application No. 61/034,451, filed on Mar. 6, 2008, provisional application No. 60/974,438, filed on Sep. 21, 2007, provisional application No. 60/955,137, filed on Aug. 10, 2007, provisional application No. 60/955,144, filed on Aug. 10, 2007, provisional application No. 60/941,250, filed on May 31, 2007, provisional application No. 60/941,258, filed on May 31, 2007, provisional application No. 60/941,261, filed on May 31, 2007, provisional application No. 60/940,955, filed on May 30, 2007.

(51) Int. Cl.
*G07F 17/32* (2006.01)
*A63F 13/12* (2006.01)
*A63F 13/30* (2014.01)

(52) U.S. Cl.
CPC ..................................... *A63F 13/12* (2013.01)

(58) Field of Classification Search
USPC .................................. 463/25, 42; 705/14.12
See application file for complete search history.

(56) References Cited

U.S. PATENT DOCUMENTS

| | | | |
|---|---|---|---|
| 6,106,395 | A | 8/2000 | Begis |
| 6,229,533 | B1 | 5/2001 | Farmer et al. |

(Continued)

OTHER PUBLICATIONS

Johnson, "Black Sun Adds Tools to Manage VR Worlds", Electronic Engineering Times, n926, pp. 152-154, Nov. 4, 1996.

*Primary Examiner* — Pierre E Elisca
(74) *Attorney, Agent, or Firm* — Pillsbury Winthrop Shaw Pittman LLP

(57) ABSTRACT

The present invention relates to a computer system and method for promoting on-line activities on desired sites via a virtual entertainment system that provides games, interactions or activities that take place either partially or fully on the partner's website or within the virtual space associated with the partner's website. According to one aspect, the invention drives on-line traffic to partner sites using Virtual Collectibles and other prizes rewarded for participation in Internet-based games. The games are designed to promote users to visit and/or perform other activities on the partner sites, and can include giveaways, special offers, treasure hunts, combo puzzles, among many other types of games. According to other aspects, the games can be played by users in the course of, or with very little effort in addition to casually surfing the web.

8 Claims, 9 Drawing Sheets

(56) References Cited

U.S. PATENT DOCUMENTS

| | | |
|---|---|---|
| 6,268,872 B1 | 7/2001 | Matsuda et al. |
| 6,314,475 B1 | 11/2001 | Collin et al. |
| 6,612,932 B2 | 9/2003 | Stern |
| 6,618,593 B1 | 9/2003 | Drutman et al. |
| 6,729,884 B1 | 5/2004 | Kelton et al. |
| 6,746,332 B1 | 6/2004 | Ing et al. |
| 6,749,511 B2 | 6/2004 | Day |
| 6,847,940 B1 | 1/2005 | Shelton |
| 6,879,994 B1 | 4/2005 | Matsliach et al. |
| 7,249,139 B2 | 7/2007 | Chuah et al. |
| 7,412,422 B2 | 8/2008 | Shiloh |
| 7,433,834 B2 | 10/2008 | Joao |
| 7,455,586 B2 | 11/2008 | Nguyen et al. |
| 7,480,727 B2 | 1/2009 | Domschitz |
| 7,529,797 B2 | 5/2009 | Tseng et al. |
| 7,685,204 B2 | 3/2010 | Rogers |
| 7,844,590 B1 | 11/2010 | Zwicky et al. |
| 7,901,288 B2 * | 3/2011 | Barsness et al. ........... 463/30 |
| 7,925,703 B2 | 4/2011 | Dinan et al. |
| 8,002,617 B1 | 8/2011 | Uskela et al. |
| 8,105,153 B2 * | 1/2012 | Buecheler et al. ......... 463/23 |
| 2002/0013174 A1 | 1/2002 | Murata |
| 2002/0023178 A1 | 2/2002 | Strasnick et al. |
| 2002/0052925 A1 | 5/2002 | Kim et al. |
| 2002/0065136 A1 | 5/2002 | Day et al. |
| 2002/0065826 A1 | 5/2002 | Bell et al. |
| 2002/0068631 A1 | 6/2002 | Raverdy et al. |
| 2002/0094870 A1 | 7/2002 | Murray |
| 2002/0099818 A1 | 7/2002 | Russell et al. |
| 2002/0120501 A1 | 8/2002 | Bell et al. |
| 2002/0178060 A1 | 11/2002 | Sheehan |
| 2003/0014423 A1 | 1/2003 | Chuah et al. |
| 2003/0156135 A1 | 8/2003 | Lucarelli |
| 2003/0191816 A1 | 10/2003 | Landress et al. |
| 2004/0058694 A1 | 3/2004 | Mendiola et al. |
| 2004/0122895 A1 | 6/2004 | Gourraud |
| 2005/0086605 A1 | 4/2005 | Ferrer et al. |
| 2005/0137015 A1 | 6/2005 | Rogers et al. |
| 2005/0174975 A1 | 8/2005 | Mgrdechian et al. |
| 2006/0183551 A1 | 8/2006 | Prudent |
| 2006/0282426 A1 | 12/2006 | Spears |
| 2006/0282530 A1 | 12/2006 | Klein et al. |
| 2007/0030824 A1 | 2/2007 | Ribaudo et al. |
| 2007/0037574 A1 | 2/2007 | Libov et al. |
| 2007/0043583 A1 | 2/2007 | Davulcu et al. |
| 2007/0043646 A1 | 2/2007 | Morris |
| 2007/0067441 A1 | 3/2007 | Pomerantz |
| 2007/0078962 A1 | 4/2007 | Donnelli et al. |
| 2007/0150537 A1 | 6/2007 | Graham |
| 2007/0150603 A1 | 6/2007 | Crull et al. |
| 2007/0197296 A1 | 8/2007 | Lee |
| 2007/0203828 A1 | 8/2007 | Jung et al. |
| 2007/0208751 A1 | 9/2007 | Cowan et al. |
| 2007/0225070 A1 | 9/2007 | Zahorik et al. |
| 2007/0271273 A1 | 11/2007 | Cradick et al. |
| 2007/0294351 A1 | 12/2007 | El-Emam |
| 2008/0046363 A1 | 2/2008 | Ali et al. |
| 2008/0046458 A1 | 2/2008 | Tseng et al. |
| 2008/0059575 A1 | 3/2008 | Malobrodsky et al. |
| 2008/0091692 A1 | 4/2008 | Keith et al. |
| 2008/0097851 A1 | 4/2008 | Bemmel et al. |
| 2008/0097871 A1 | 4/2008 | Williams et al. |
| 2008/0102947 A1 | 5/2008 | Hayes |
| 2008/0104496 A1 | 5/2008 | Williams et al. |
| 2008/0140650 A1 | 6/2008 | Stackpole |
| 2008/0160877 A1 | 7/2008 | Lipman |
| 2008/0215975 A1 | 9/2008 | Harrison et al. |
| 2008/0215995 A1 | 9/2008 | Wolf |
| 2008/0220876 A1 | 9/2008 | Mehta et al. |
| 2008/0262910 A1 | 10/2008 | Altberg et al. |
| 2008/0262911 A1 | 10/2008 | Altberg et al. |
| 2009/0152349 A1 | 6/2009 | Bonev et al. |
| 2009/0164275 A1 | 6/2009 | Chen et al. |
| 2009/0198666 A1 | 8/2009 | Winston |
| 2009/0241035 A1 | 9/2009 | Tseng et al. |
| 2009/0254459 A1 | 10/2009 | Williams |
| 2009/0271212 A1 | 10/2009 | Savjani et al. |
| 2009/0292595 A1 | 11/2009 | Tonnison et al. |
| 2011/0167481 A1 | 7/2011 | Ganz |
| 2011/0282646 A1 | 11/2011 | Bill |
| 2012/0015668 A1 | 1/2012 | Mgrdechian |

\* cited by examiner

FIG. 5

ROCKETON

Nav Bar

TREASURE HUNT:
The biggest Treasure Hunt in the Galaxy is on! Here's a hint at where the booty is buried...

DEAD MAN'S RIDDLE:
It's not black, it's not white, it's red all over. Look West and think big. There are stars inside and throughout.

602 → search: [ ] Go

| location | time ▽ | headlines |
|---|---|---|
| | 9/17 (11:25 pm) | The biggest Treasure Hunt in the Galaxy is on! |
| Planet U&Me | 9/17 (6:34 am) | U&Me just built the first Cyber Snow Arena on his planet! |
| eBay.com | 9/17 (1:00 pm) | Planet Umba has been hit by a Solar Storm. Avoid it at all cost! |
| Planet UThePig | 9/17 (3:00 am) | A heard of Blue Yeti have been spotted on eBay. |
| Nike.com | 9/16 (8:43 pm) | UThePig is now the most active trader in the Galaxy. |
| Planet Blue | 9/16 (3:37 pm) | Nike is giving Cosmic Sneakers to the first 200 visitors. |
| GAP.com | 9/16 (7:00 am) | Hilary Clinton is holding a live chat session on Planet Blue. |
| | 9/16 (3:10 am) | Win 100 collectibles if you buy a pair of pants at GAP.com |
| | 9/15 (8:00 pm) | Be the first person to purchase a Green Volcano for your planet. |

METHOD AND APPARATUS FOR PROMOTING DESIRED ON-LINE ACTIVITIES USING ON-LINE GAMES

CROSS-REFERENCE TO RELATED APPLICATIONS

The present application is a continuation of U.S. application Ser. No. 13/567,000, Now U.S. Pat. No. 8,510,413, filed Aug. 3, 2012, which is a continuation of U.S. application Ser. No. 12/111,916, filed Apr. 29, 2008, now U.S. Pat. No. 8,239,487, which claims priority to U.S. Provisional Application No. 60/940,955, filed May 30, 2007, U.S. Provisional Application Nos. 60/941,250, 60/941,258 and 60/941,261, all filed May 31, 2007, U.S. Provisional Application Nos. 60/955,137 and 60/955,144, both filed Aug. 10, 2007, U.S. Provisional Application No. 60/974,438, filed Sep. 21, 2007, and U.S. Provisional Application No. 61/034,451, filed Mar. 6, 2008, the contents of all such applications being incorporated by reference herein in their entirety

FIELD OF THE INVENTION

The present invention relates to computer and network software, and more particularly it relates to a system and method for promoting on-line activities using Internet-based games with prizes including virtual objects awarded in connection with predetermined on-line activities associated with the games.

BACKGROUND OF THE RELATED ART

Online traffic is a precious commodity among web advertisers and promoters. For one, increased net traffic often translates directly into increased revenues for websites that engage in the sale of goods and services. Second, many websites that provide information but do not engage in sales generate their revenues by charging for advertising space on their webpages. Examples include search engines and "blog" websites. These websites usually charge advertisers by the number of clicks on the advertisers' links. For these websites, web traffic has a two-prong importance. First, a threshold amount of online traffic must be achieved before an advertiser will agree to advertise on that website. Second, once an advertiser has been retained, the amount of traffic directed to advertiser websites directly translates to how much advertisers will pay. Third and finally, for many infant websites that largely depend on user-provided content, such as discussion forums or social networking tools, it is paramount to achieve a critical mass of online traffic in an early stage in order to go forward. At these websites, the more visitors there are, the more attractive the website becomes to other visitors. For example, most new auction websites will not be able to compete successfully against eBay because it is very difficult to achieve the initial critical mass. Buyers and sellers prefer to visit eBay because it is much easier to find other buyers and sellers there. Thus, how to effectively generate, attract, and retain online traffic is a challenge faced by many websites owners and administrators.

Internet search engines such as Google and Yahoo! and other news and information web sites attempt to drive traffic to third party web sites by providing banner ads, ordered search results, and click-through advertising. However, the effectiveness of these types of ads in actually generating traffic can be limited. For example, many users do not pay much attention to banner and click-through ads, and quickly focus on other displayed content that interests them. Moreover, clicks on ads provided by search engines or other websites are often accidental or fraudulent, and do nothing in themselves to encourage users to spend any time on the associated site.

Meanwhile, some other existing "Get Paid to Surf" products and services attempt to drive traffic to specific sites on the Internet by rewarding users with real-world discounts, frequent flier miles, cash, or others. These products typically operate on an accumulated point system. One example of this type of prior art reward program is U.S. Pat. No. 6,749,511, which discloses a website promotional process. It requires a user to visit a host site and then browse through a plurality of advertiser or affiliate sites whose hyperlinks are provided at that host site to find and match a number of embedded indicia. It further requires the indicia to be embedded within the advertiser or affiliate sites that are promoted by the host site. A prize is rewarded if the participant finds a sufficient number of matching indicia within a designated time period.

One major disadvantage of these "reward" products is that they lack entertainment value and thus fail to retain user interest, even though sometimes they are described as "games." These "rewards" such as points or currency typically have no entertaining features themselves such as visual art, animation or sounds. Furthermore, they do not provide the users with any special abilities or powers that could be used in an online game, and they provide no other decorative or personalizable value for the user. Moreover, similar to the on-line advertising services described above, they do not effectively reward users for activities that actually promote and create revenue for the advertising sites.

Another major disadvantage with these point-based products is that the points lack the ability to be associated with brands or advertisers' products. The generic reward units, such as points or miles that a user collects from different websites, cannot be made different from one another. Ten points earned from visiting website A is no different than ten points earned elsewhere. It would be desirable if different rewards could be configured to possess unique properties associated with a certain name or brand or product. An advertiser or affiliate could then give to users who visit their websites Virtual Collectibles that possess special properties that promote their brands, services or goods.

A further disadvantage, exemplified by the above-identified patent among others, is that reward program advertisers or affiliates must, in addition to paying a fee to the host site, provide support within their websites of content needed to support the accumulation of points and rewards (i.e. indicia such as a JPEG file with a predetermined filename and located at a URL associated with a sponsor). This is intrusive and burdensome on such organizations. Moreover, participants must allow cookies to be stored on their computers, which not all participants are willing to do and/or which can be easily disabled or defeated.

U.S. Pat. No. 8,108,459, commonly owned by the present assignee, the contents of which being incorporated herein by reference in their entirety, dramatically advanced the state of the art by providing a method and apparatus for distributing virtual objects such as Virtual Collectibles. According to an aspect of that invention, users can accumulate Virtual Collectibles in the process of casually surfing the web. The system detects what site(s) the user is visiting and determines whether to reward the user with a Virtual Collectible when the user enters or links to a predetermined URL, such as the URL of a partner website. By entertaining the user in the process of visiting a partner website, the user is more likely to remember and favorably view the partner and its products and services.

Although this functionality by itself vastly improves upon conventional means of promoting on-line activities, additional improvements are possible by further leveraging the discoveries and functionalities of the commonly owned patent, including improvements that even further overcome the above-described and other disadvantages.

SUMMARY OF THE INVENTION

The present invention relates generally to the field of computer and network software, and more particularly it relates to a computer system and method for promoting on-line activities on desired sites via a virtual entertainment system that provides games, interactions or activities that take place either partially or fully on the partner's website or within the virtual space associated with the partner's website. According to one aspect, the invention drives on-line traffic to partner sites using Virtual Collectibles and other prizes rewarded for participation in Internet-based games. The games are designed to promote users to visit and/or perform other activities on the partner sites, and can include giveaways, special offers, treasure hunts, combo puzzles, among many other types of games. According to other aspects, the games can be played by users in the course of, or with very little effort in addition to casually surfing the web.

According to other aspects, the invention provides on-line advertisers and/or partners having Internet sites with means to configure promotions that are tied to the games hosted by the system. According to some additional aspects of the invention, the system can provide superior on-line advertising revenue opportunities as compared to traditional banner ads and click-through advertising through the appeal of Virtual Collectibles. In addition, the present invention allows the system to be configured to allow advertiser and partner websites to configure the Virtual Collectibles and other prizes rewarded to users for desired effects. In furtherance of these and other aspects, a method and apparatus according to the invention includes a client-server system where the server centrally hosts Internet-based games that users can participate in while they casually surf the web. The system further selects, maintains and controls the distribution of such virtual objects and other prizes according to prize criteria, and the client application communicates with the server to monitor the user's on-line activities and provides an interface for the user to interact with the server and other users. The client software monitors on-line activities of the user, and communicates such activity to the server. The server, based on the communications from the client, predefined prize criteria, promotions, and other factors, may make decisions as to selecting one or more virtual objects with special properties, and giving such virtual objects to the user. The server can further allow recording and reporting of game activities, including those that result in prizes being distributed to users. Partners and advertisers may further be allowed to access the system for reports of rewarded activity, and to configure prizes to be provided and/or promotions related to the on-line games hosted by the system.

DESCRIPTION OF THE DRAWINGS

These and other aspects and features of the present invention will become apparent to those ordinarily skilled in the art upon review of the following description of specific embodiments of the invention in conjunction with the accompanying figures, wherein:

FIGS. 4 to 8 are screenshots illustrating how various types of promotions and games made possible according to example embodiments of the invention.

DETAILED DESCRIPTION OF THE PREFERRED EMBODIMENTS

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

Figure 1:
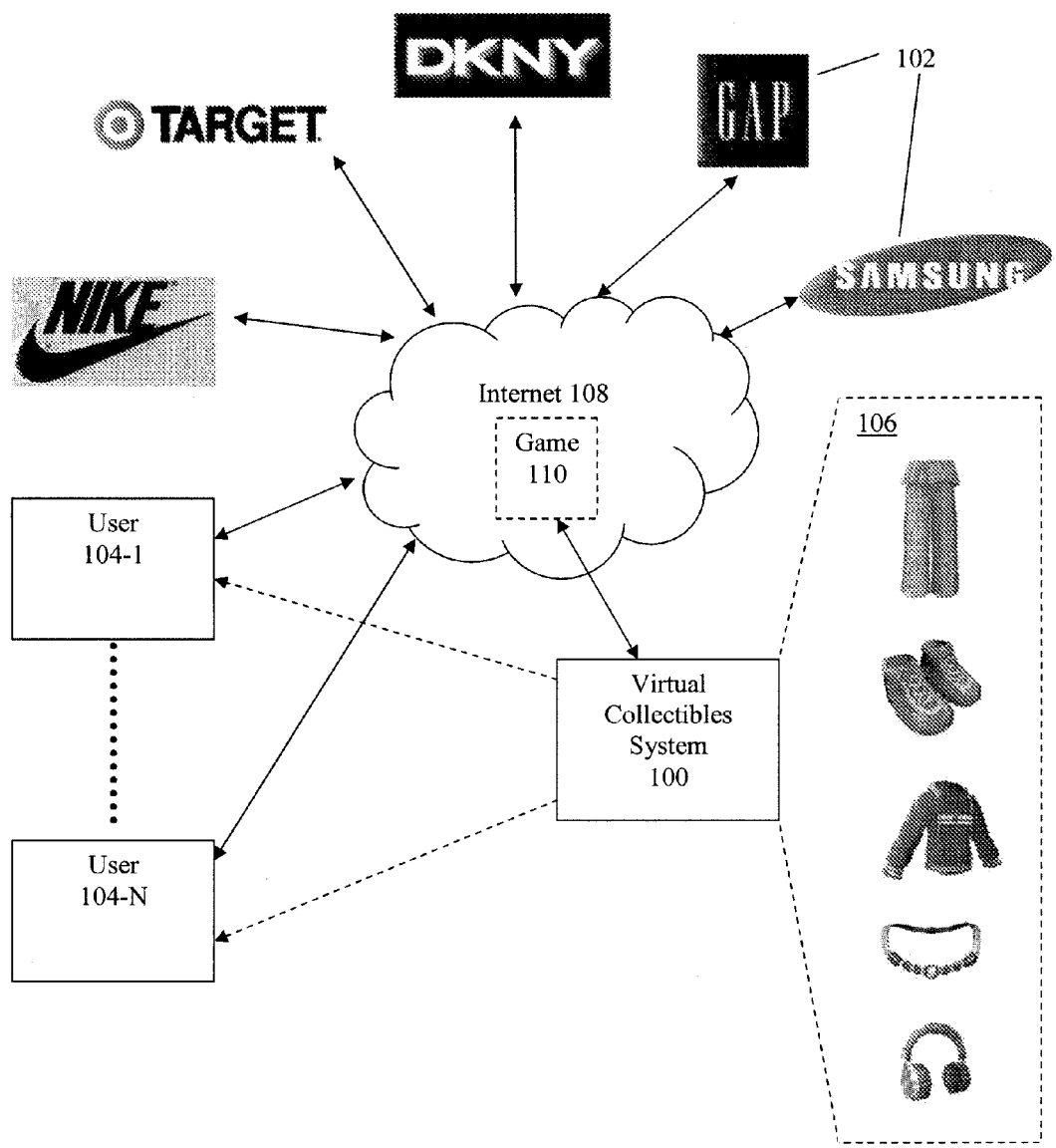
FIG. 1 is a block diagram illustrating the basic concepts of promoting on-line activities through games with prizes including Virtual Collectibles according to the invention.

As generally shown in FIG. 1, the present invention can be embodied in a system 100 that drives on-line traffic to sites associated with advertisers and sponsors 102 by hosting and controlling games 110 that users 104 can participate in while casually surfing the web including sites associated with sponsors 102. System 100 can further reward users 104 with virtual collectibles 106 and/or points or currency based on their activities and participation in such games. For example, the game can be a treasure hunt or scavenger hunt and hints can be provided within the game that drive players to one or more specific partner sites. Or special promotions can include placing branded Virtual Collectibles in the game that can be enhanced by visiting a partner site. Many other types of promotions and games that drive traffic to a partner site are possible, as will become apparent from the descriptions below.

According to other aspects, the present invention leverages and expands on the discoveries and functionalities of the above-mentioned commonly owned patent. For example, that patent provides an interactive system that distributes virtual objects (i.e. Virtual Collectibles) to users while they are casually surfing the web. Each Virtual Collectible consists of one or more attributes. Attributes may determine the virtual object's appearance, behavior, value, virtual location, ownership, etc. Virtual Collectibles are virtual objects that are potentially unique.

According to some aspects of the commonly owned patent, Virtual Collectibles are advantageous over traditional points because they can make the users who own them appear more appealing to other users in a rule-based system. This can be achieved in a number of different ways. For example, each user may have an avatar that represents them as they navigate in the system. Each user may also own other Virtual Collectibles that accessorize the avatar, such as clothing, hats, and facial features. These Virtual Collectibles may attach to a user's avatar or may be associated with a user's profile, virtual home or virtual space. Examples include a user collecting vehicles, weapons, medicine, furniture, mini-games, planets, badges, etc. Owning these Virtual Collectibles can enhance the user's status within the game or social network. By collecting highly sought-after Virtual Collectibles and displaying them for other users to see, a user can obtain recognition of achievement from the community. Highly decorative or rare Virtual Collectibles not only act as status symbols, but they can also be used to personalize the users' avatars, profiles or online virtual spaces. By displaying these Virtual Collectibles or arranging them in a unique combination, users can express and personalize their appearance, as well as decorate their virtual spaces in a pleasing manner.

According to some additional aspects of the commonly owned patent, certain Virtual Collectibles can be made more difficult to obtain (e.g. rarer, harder to find, less frequently available, or more expensive), and therefore some Virtual Collectibles can be effectively more desirable than others. As a result, the commonly owned patent allows control over the visual appeal and desirability of the Virtual Collectibles not only by thoughtful aesthetic design but also by controlling the scarcity of the Virtual Collectibles. Controlling the desirability of the Virtual Collectibles enables developers to enhance the entertainment value of the system, as well as enabling partners and sponsors to have a greater control over targeting audiences. For example, where a user's online identity is represented by an avatar, these may be customized by other Virtual Collectibles such as clothing, accessories, hairstyles, etc., certain or all of which can be made more appealing by being more difficult to obtain.

Moreover, according to some further aspects of the commonly owned patent, Virtual Collectibles can be branded and carry the logos or identifying marks of partners and sponsors. By associating Virtual Collectibles with specific marks and brands, the system can heighten user interest, foster brand recognition and loyalty, and give partners and sponsors the ability to market their products and services more directly. For example, a Virtual Collectible can bear the logo of a sponsor, such as a spaceship Virtual Collectible bearing the Ford logo. By making the Virtual Collectible visually appealing and/or difficult to obtain, greater brand recognition and loyalty can be promoted. Moreover, acquiring such a highly appealing Virtual Collectible can be tied to a sponsor's goal of promoting its products, such as making it available as a prize to one or more users for viewing a promotional video at a dedicated URL in its website.

Generally, the commonly owned patent offers Virtual Collectibles to users as an incentive to visit partner and sponsor websites. They are often tied to a specific URL. That is, the user will receive the Virtual Collectible only if she visits that URL. The commonly owned patent recognizes that since Virtual Collectibles are desired by the users, in order to drive online traffic to their websites, sponsors may offer a straight award-upon-visit Virtual Collectible to every visitor of a certain web location, or URL.

According to some aspects, the present invention leverages and expands on the Virtual Collectibles distribution techniques of the commonly owned patent in new and useful ways. For example, in addition or alternatively to automatically awarding certain Virtual Collectibles to every user who visits a certain URL, further entertainment-based mechanisms can be added to drive traffic to certain URLs associated with on-line sites or on-line activities of partners or advertisers using Virtual Collectibles in a game setting.

According to additional aspects, the Internet-based games of the present invention can be easily played while users are already casually surfing the web, and can further make web-surfing itself even more entertaining. For example, the user can be rewarded with a Virtual Collectible while casually surfing the web, and then become interested in a game of acquiring additional Virtual Collectibles that will complete a treasure hunt or combo puzzle. Accordingly, in addition to being entertained by receiving a Virtual Collectible, the user will be entertained through the process of potentially acquiring more.

In addition, the present invention allows the system to be configured to allow advertiser and partner websites to configure games, promotions, and game prizes for desired effects. For example, a company with an on-line presence such as a web site may wish to encourage users to view a product demo video on its site. It can establish a promotion in which the first 100 or 200 users who visit the site and view the demo video will receive a prize including a Virtual Collectible. Additional promotional content may also be added to the system of the invention (e.g. text messages, banner content, etc.) to advise users of the opportunity to receive the prize.

As another example, a partner may configure a game prize to be a Virtual Collectible that is configured as a branded digital object with special properties that influence the rules of the system and benefit the user. So Nike may distribute an Air Jordan Virtual Collectible that resembles a top-selling Nike shoe. This collectible could give the user special advantages in the rules-based system, such as a high redemption value (e.g. for real currency, or a coupon redeemable against the purchase of any Nike products), or double points on days when NBA basketball games are played, or making the user's avatar move faster across the screen when wearing the Air Jordan Virtual Collectible shoes. In this way, advertisers and partners can customize the look and feel of Virtual Collectibles, as well as their specific properties and benefits.

Configuring the scarcity of Virtual Collectibles distributed to users can also be used to drive desired online activities. Certain advertisers and partners may offer rare Virtual Collectibles to users who visit or engage in particular activities on their site. For example, the first 200 users to register and sign up to receive newsletters at an advertiser or partner website may be able to pick up an extremely rare Virtual Collectible that has special properties associated with it (e.g. a flying spaceship). The result is being able to promote specific online activities for a specific advertiser or partner based on offering a limited-edition or rare Virtual Collectible.

Thus, by awarding Virtual Collectibles as prizes in an Internet-based game that can be played mainly while users are casually surfing the web, adjusting the value of the various Virtual Collectibles within the rules-based system, and providing scarcity of certain items, the invention can influence the flow of traffic and online activities within the system to advertiser and partner websites. This flow of traffic and online activity can then be monetized by the system, where advertisers and partners pay for visitor activities on their websites based on distribution of Virtual Collectibles and/or advertising within the system.

A method and system of driving online traffic and promoting on-line activities through distribution of Virtual Collectibles and other prizes in Internet-based games according to certain aspects of the invention will now be described in detail beginning with FIG. 2.

Figure 2:
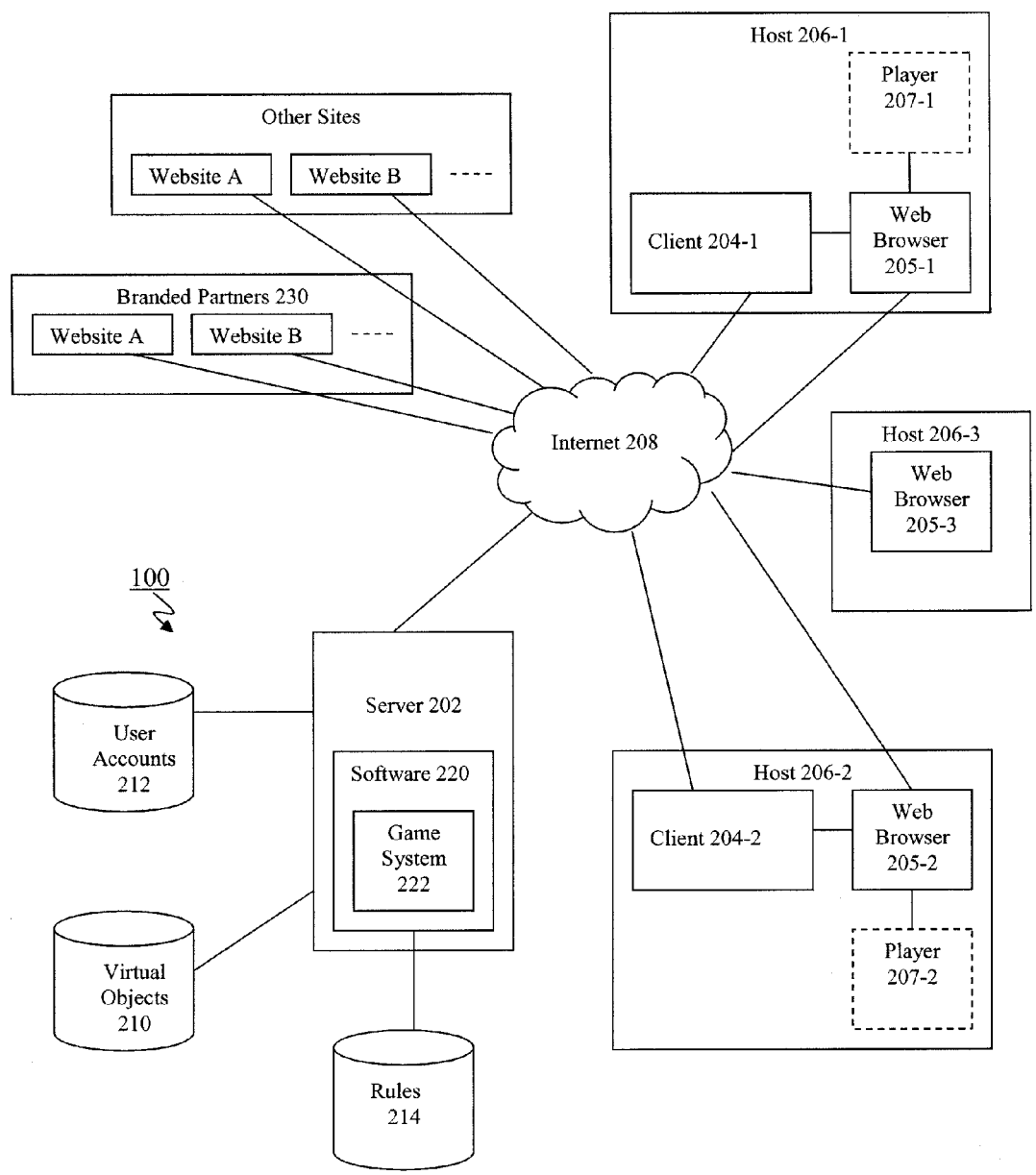
FIG. 2 is a block diagram of a on-line activity promotions system according to aspects of the invention.

As shown in FIG. 2, a system 100 according to the invention includes server 202 that communicates with clients 204-1, 204-2, etc. having associated hosts 206-1, 206-2, etc. via Internet 208. In embodiments, server 202 can further communicate with hosts (e.g. 206-3) that do not have clients. In general operation, server 202 controls games and other activities that users with clients 204 can participate in, and are designed to drive traffic to websites of partners 230, and further controls the distribution of virtual objects to users based on user activity communicated by clients 204 relating to their participation in such games and activities.

Server 202 can be implemented by one or more server computers such as those available from Sun, HP, BEA, etc. and associated server software such as that available from Microsoft, BEA, Sun, Linux, Unix, Apache, etc. As shown in FIG. 2, server 202 hosts and maintains a database 210 of Virtual Collectibles and database 212 of user accounts. It further includes associated software 220 comprising, for example, operating system(s), web server(s), database server(s), and other server software that have been configured with functionality to be described in detail herein, as well as in the commonly owned patent. According to aspects of the invention, software 220 at least includes games system 222 that hosts games that allow users to win Virtual Collectibles, and/or control attributes thereof, based on game rules 214.

In embodiments, server 202 maintains a list of Virtual Collectibles belonging to individual users in user accounts database 212, and/or credits, points or other real or virtual currency that can be redeemed or exchanged for Virtual Collectibles. It should be noted that server 202 can maintain other conventional user account information such as usernames, passwords, contact information, etc., either in database 212 or other locally or remotely accessible storages. It should be further noted that the depiction of separate storage 210, 212, and 214 for Virtual Collectibles, user accounts, and rules, respectively, is intended to be representative rather than structural, and that many different forms of local, remote, online, offline, permanent and temporary types of storage are possible, either singly or in combination.

According to certain aspects of the invention to be described in more detail below, users having clients 204 are rewarded with Virtual Collectibles by server 202 based on the users' participation in Internet-based games which drive on-line traffic to partners 230 (e.g. www.ford.com, www.coke.com, etc.) who each have one or more websites accessible by browsers 205. As further shown in FIG. 2, users can also access other websites in addition to partner websites 230.

Hosts 206 are generally any type of computing device a person can now or in the future use to access the Internet or other public network, and which can host at least a client application 204 and Internet access hardware (not shown) and software such as a browser 205. In an example where host 206 is implemented by a personal computer such as a Mac, PC, notebook or desktop computer, host 206 typically includes an operating system such as Windows or Mac OS, a browser application such as Windows Explorer or Mozilla Firefox, and network access hardware such as a wired or wireless modem. Hosts 206 further preferably include graphical displays (e.g. one or more LCD screens) and I/O devices (e.g. keyboard, mouse, keypad, scroll wheels, microphone, speakers, video or still camera, etc.) for providing a user interface within the operating system and communicating with client application 204. Hosts 206 are not limited to personal computers, but can include cellular phones, personal digital assistants (PDAs), game systems (e.g. Playstation, Wii, Xbox, etc.) or other devices, and those skilled in the art will understand how implementation details can be changed based on the particular type of host device.

Clients 204 are software applications that reside on the hosts and typically execute under the host operating system. The client software application 204 can be either a standalone application, such as a game interface that occupies a large portion of the computer screen when in use, a plug-in that is embedded into another application such as a web browser and occupies very little screen space, or other type of application and/or screen configuration. In general operation to be described below in more detail, the client application monitors the user's on-line behavior, such as the URLs that the user is visiting via browser 205. It sends this information over the Internet to the server, which in turn uses it to make decisions as to whether to make one or more Virtual Collectibles available to the user based on the user's behavior.

The client application 204 also preferably provides a graphical interface using the display and I/O devices of host 206 by which the user navigates through, and interacts with other users in, a virtual world. In embodiments, these interactions and user activities include participation in games hosted and controlled by server 202. As described in more detail in the commonly owned patent, the user may also initiate an event requiring server attention, such as a trade request, from the interface. The user may also interact with other users using chat and other conventional and new online communication mechanisms, including but not limited to voice and video communications, hosted by server 202 and within or without the graphical interface provided by the client application. In embodiments, the graphical interface provides a graphical representation of other users in the form of avatars, and can also display the Virtual Collectibles that the user or other users own, either alone or together with their respective avatars. The various attributes of a Virtual Collectible control how it is to be displayed by the client application 204, thus giving a distinctive look and feel to unique Virtual Collectibles.

In one example implementation shown in FIG. 2, where host 206 is a laptop or desktop personal computer, client application 204 is an ActiveX control, browser plug-in, C++ application, Java application, Flash application and/or any combination thereof or a similar technology that operates with browser 205, and has at least the functionality described above and in the commonly owned patent, and to be described in more detail below. Host 206 further includes an optional multimedia player 207 such as a Flash Player for use in displaying multimedia content provided by the invention in a multimedia interface. Those skilled in the art will understand how to implement the principles of the invention using such conventional mechanisms after being taught by the below detailed descriptions of the functionality provided by server 202 and client 204, as well as the details in the commonly owned patent.

Internet 208 is, for example, the public Internet, but can further or alternatively include any combination of wired and wireless networks, public and private, that are traversed by users who seek access to content on the public Internet, as will be appreciated by those skilled in the art. As should be further understood, sites of partners 230 and other sites shown in FIG. 2 are websites that are publicly accessible via Internet 208 and the World Wide Web and protocols such as IP and http, and are hosted by web servers, servers and databases as understood by those skilled in the art.

It should be noted that the configuration illustrated in FIG. 2 is intended to be illustrative and not limiting, and those skilled in the art will appreciate various alternative configurations, topologies, etc. For example, while only one server 202 is shown, there may be many servers 202, either in the same location and/or at the same network address, and/or distributed across many locations and/or network addresses. Moreover, server 202, partner 230 sites and other sites, and hosts 206 are typically all remotely located from each other, both physically and with respect to different network addresses such as IP addresses. Many other alternatives are possible, as will become apparent to those skilled in the art.

Figure 3:
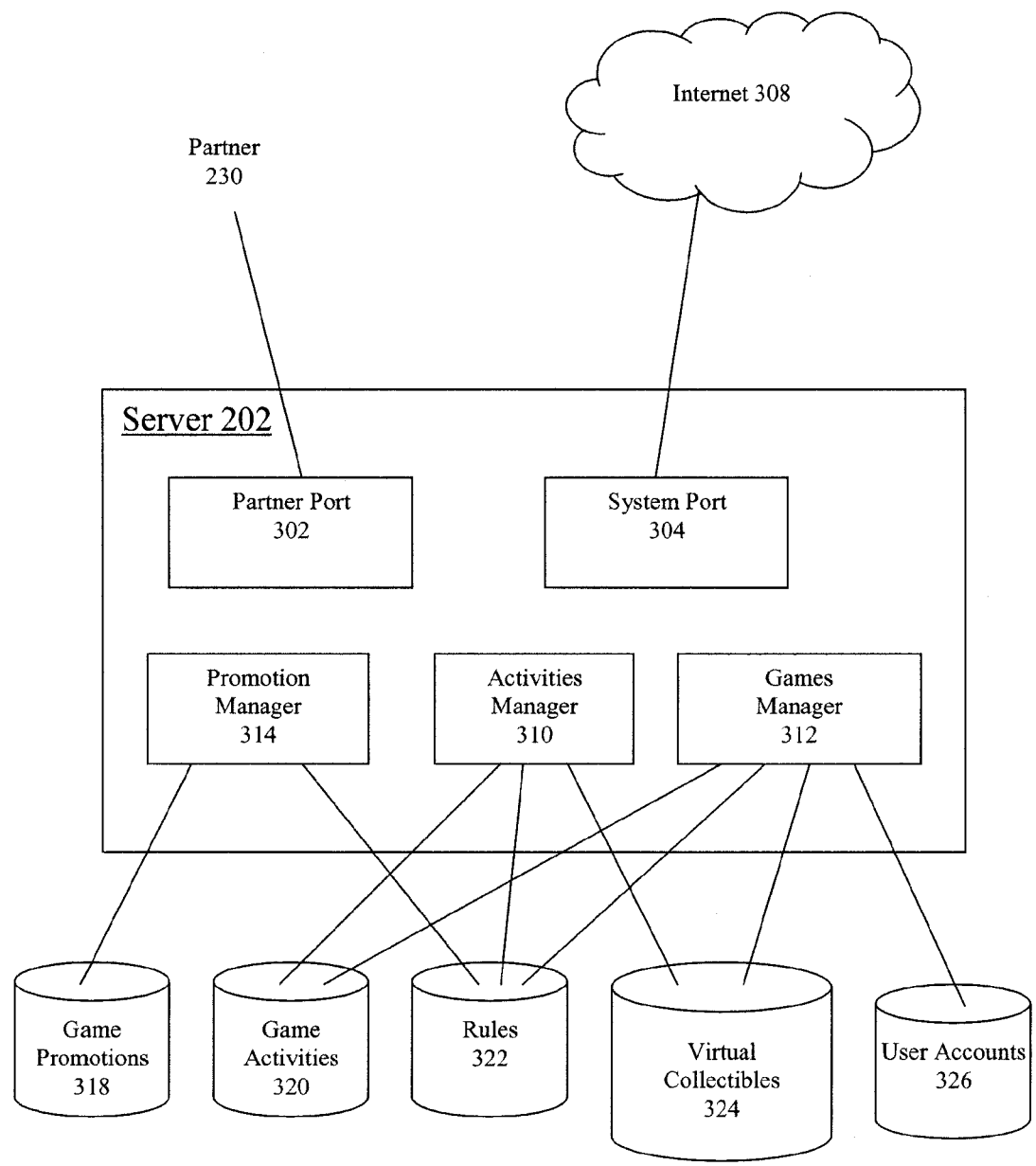
FIG. 3 is a detailed block diagram of an example implementation of a server in a on-line activity promotions system according to aspects of the invention.

An example implementation of server 202 is illustrated in further detail in FIG. 3. As shown in FIG. 3, server 202 includes partner port 302, system port 304, activities manager 310, games manager 312 and promotions manager 314. Some or all of processes 302, 304, 310, 312 and 314 communicate with each other over a bus, network (not shown) and/or network protocols and can be partially or fully implemented as web applications and/or web server applications, as will be understood by those skilled in the art after being taught about their functionalities described in detail herein and in the commonly owned patent. As further shown in FIG. 3, server 202 can include one or more processes for managing structured or unstructured data including game promotions 318, game activities 320, game rules 322, virtual collectibles 324 and user accounts 326. In one example implementation, data 318, 320, 322, 324 and 326 are provided in one or more common or separate databases that can be either internally or externally stored.

In general, system port 304 handles communications with clients 204, typically hosted on devices such as PCs. Server 202 can also include the same or separate ports for handling communications with clients 204 hosted on devices such as cell phones and PDAs. It should be apparent that these need not be separate processes, but can be provided together in alternative embodiments.

In general operation, port 304 operates to communicate with clients 204 using structured messaging as defined for the appropriate client type, allowing for interaction with server 202 in order to monitor the associated users' participation in games managed by manager 312 and/or to award Virtual Collectibles 324 and/or other prizes to such users according to rules 322. In one PC example, clients 204 use http methods such as the POST method over TCP/IP and sockets to send information about URLs browsed by web browser 205 to server 202 via port 304. These and other example implementation details are described in detail in the commonly owned patent and/or will become apparent to those skilled in the art based on the following descriptions.

In embodiments, games manager 312 monitors participation of users in games defined by rules 322 via activities of users as communicated via clients 204 and system port 304, and further determines how and when to reward users with one or more Virtual Collectibles and/or prizes according to rules 322.

According to some aspects, the game system of the invention expands on and leverages the functionalities of the above-mentioned commonly owned patent. Expanding on principles and technologies described in that patent, rules 322 define games that are designed to encourage and promote on-line activities on websites of partners 230. For example, rules 322 can list Virtual Collectibles and/or real or virtual currency that can be obtained as prizes in a particular game, as well as criteria regarding how the prizes can be won by users.

As described in the commonly owned patent, when a user having a client 204 performs on-line activities, client 204 communicates information related to such on-line activities to server 202. In the present invention, manager 312 determines whether the activity is associated with one of the games listed in rules 322, and if so, manager 312 can further determine what prize and/or participation criteria associated with the game are established. Manager 312 can further determine whether the reported activity qualifies the user to receive the prize Virtual Collectible from store 324, possibly in view of prior reported activity stored in game activities 320, and possibly in addition to other Virtual Collectibles distributed in accordance with the commonly owned patent.

More particularly, the invention allows on-line games, rules and/or prize criteria to be included in rules 322 and/or specified by partners 230. The invention further allows users' participation in the games to be monitored by the system, including manager 312, rather than simply comparing a URL to a list of URLs, as in the commonly owned patent. In general, the games and/or rewards criteria are typically related to on-line activities that are deemed to effectively promote the goods and services of partners 230 while entertaining users who participate in them.

An example implementation of rules 322 according to the invention is further illustrated in the table below.

TABLE 1

| # | Game Name | Prize | Prize Criteria | URL(s) |
|---|---|---|---|---|
| 1 | Ford Mustang promo | Ford space-ship | Be one of the first 2000 persons to fill out a Mustang survey after completing a maze | www.ford.com survey page |
| 2 | Treasure hunt | Rare gems | Follow clues among several participating partner websites to fill a treasure chest | www.aaa.com, www.bbb.com, www.ccc.com, etc. |
| 3 | Gap promo | Blue Yeti | Dodge all sticky goo and be one of the first 200 persons to click on a "most recent featured products" page at www.gap.com | www.gap.com "most recent featured products" page |
| ... | ... | ... | ... | ... |
| N | Space pets combo | Three pets and 10,000 Rocket points | Each pet is separately provided at several participating websites and awarded when the user visits the URL and feeds each pet with the right food, with occasional broadcast clues or other hints provided | www.xxx.com, www.yyy.com, www.zzz.com, etc. |

As shown in the above examples, the prize criteria can reward users for providing information to the partner, such as filling out a survey. As another example shown above, the prize criteria can reward users for going to and/or spending an extended period of time on a partner site, for example by hunting for a "treasure" or "combo" item on a specific page of a partner site. As a still further example shown above, prize criteria can reward users for a specific activity, like being one of the first users to view a certain page on a partner site. Many other alternatives of games, prizes and prize criteria are possible. Moreover, it should be noted that the rules 322 such as those described in TABLE 1 above need not be completely fixed or unchangeable. For example, the URLs or Virtual Collectibles associated with a "treasure hunt" or "combo"

game can be periodically changed for desired effects of driving in-game traffic to partner sites, and/or in connection with promotions.

As should be further apparent from the above table, and from the descriptions herein, it is possible for rules 322 to define many different types of games, through which users can be both entertained and rewarded with Virtual Collectibles based on their participation and on-line activities at or with partner sites, whether or not the users completely satisfy the prize criteria. For example, the game may be a maze provided along or within other content on a partner's site that the partner wishes the user to view or access. Or the game may be a "treasure hunt" that encourages users to follow clues among several participating partner websites to fill a treasure chest. Alternatively, the game may be an "action" type game, such as causing animated representations of sticky goo to be shot toward the user's avatar when the user visits a partner site, and which the user must dodge by manipulating the position of the avatar within the browser screen. Still further, the game may be one in which a different "pet" is separately provided at several participating websites and the user needs to feed each pet with the right food in order to win a "combo" of space pets.

Many other types of games are possible in addition to those referred to in the table above, such as those allowing interactions between users. For example, games may include interactive games, such as trivia contests, avatar beauty contests, hide-and-seek games, etc. Moreover, interactive games can include a real estate game, like Monopoly, where users actually buy up URLs and resell them. Another example includes users fighting battles across websites, where specific websites have special properties, such as providing weapons or defense, making them more valuable, and driving users to visit them. Those skilled in the art will recognize many other alternatives after being taught by these examples, and will understand that the invention includes them, among others.

It should be apparent that the system can include various mechanisms for determining whether user activity meets the prize criteria specified in rules 322, examples of which are described below.

In one example of a give-away game, games manager 312 receives a URL from client 204 via port 304 and simply determines whether it matches one or more URLs in one of the stored games in rules 322. If so, manager 312 determines that the listed prize should be rewarded to the user. It should be noted that give-away games need not be completely free to the users. For example, points and/or virtual currency may be specified in the prize criteria to be exchanged for a special Virtual Collectible. In this case, manager 312 can further access the user's account to determine whether they have sufficient credits to cover the exchange. Users may also need to complete specific game tasks before the prizes are awarded, such as destroying enemy ships hiding in wait at partner websites, and these criteria can obtained from game activities 320.

In an example of a promotion tied to a specific product of a partner 230, a game may give a prize to one or more users who are the first to view a product promotional video having an associated specific URL on a partner site. In this example, when the URL is entered or activated by the user (e.g. a button click on a web page associated with a website of partner 230) and reported by client 204 via port 304, manager 312 compares the URL to URLs in stored games in rules 322. If there is a match, manager 312 further retrieves prize criteria for the game, for example, a number stipulating the number of users who are the first to view the video. Manager 312 can then compare the stipulated number in rules 322 with the number of users who have already viewed the video, stored in activities 320. If the number recorded in activities 320 is less than the stipulated number, manager 312 determines that the associated prize can be rewarded, and can further update the number stored in activities 320.

In another example, games manager 312 can include functionality for tracking the number of items collected for a "combo," or a "treasure hunt". For example, manager 312 can keep a record of whenever a user obtains any items in a combo or treasure hunt game in activities 320. Rewards manager 312 can then use this information and compare it to the criteria established in rules 322 to determine whether the prize criteria have been met, for example when the user has obtained all the items in a combo or treasure hunt game.

Those skilled in the art will be able to understand how to implement the various mechanisms to be incorporated into games manager 312 and/or client 204 for tracking on-line behavior and/or determining whether such behavior meets or matches prize criteria after being taught by the present specification and the details of the commonly owned patent.

Those skilled in the art will further appreciate that not all games hosted by the system and defined in rules 322 need to have associated prizes and/or rewards. As such, the game itself can be considered an award or a distribution of a Virtual Collectible to the user, albeit temporary, and not necessarily permanently assigned to the user's account, as in the commonly owned patent.

As further shown in FIG. 3, and described in the commonly owned patent, when games manager 312 determines that a user's on-line behavior meets or exceeds prize criteria in rules 322, an associated Virtual Collectible 324 or other prize can be made available to the user. If the user accepts and/or acknowledges the prize, games manager 312 can update the user's account in database 326 to associate the Virtual Collectible, points and/or real or virtual currency with the user.

According to additional aspects of the invention and as shown in FIG. 3, when a prize award or other game-related activity has been detected, games manager 312 can further record information regarding the activity in database 320. For example, database 320 can store details regarding the number and type of Virtual Collectibles distributed to users, and/or details regarding the activity, such as the time spent on the site, user browsing patterns, user profiles, user interests, time of day, date, and demographic information, like age, sex and zip code, regarding the user that received the reward as well as statistic details of what triggered each reward.

As further shown in FIG. 3, server 202 in this example implementation of the invention includes partner port 302, activities manager 310 and promotions manager 314.

Partner port 302 can provide a web-based or network interface for partners to access server 202, and for example certain of the functionalities of activities manager 310 and/or promotions manager 314, to be described in more detail below. Port 302 can provide authentication mechanisms for securely accessing server 202 and/or manager 310. Although shown separately, it should be apparent that ports 302 and 304 can be implemented partially or fully together.

In general, activities manager 310 allows configuration of, and reports about, the activities and Virtual Collectibles and/or other prizes associated with games hosted by the system of the invention. For example, manager 310 can access, store or configure Virtual Collectibles in database 324. Manager 310 can also access, store or configure rules in database 322, including activities defined by prize criteria as described above, and associate Virtual Collectibles, points and/or real or virtual currency to be associated with game prizes. Manager 310 can also access partner activities 320, for example to receive reports of rewarded activity.

Activities manager 310 can further enable implementation of an additional number of system monetization features of the present invention. For example, the reports of activities recorded in database 320 and reported by manager 310 can be used to charge partners 230 for the online activities promoted and recorded by the system. In this regard, pricing for advertisers and partners can be set in various ways. For example, a fixed price can be set for the number of prizes of a certain Virtual Collectible, or the price per prize of the certain Virtual Collectible may be set through a bidding process by advertisers and partners. Or advertisers and partners can pay for the number of visitors that perform a certain online activity rewarded by the system. For example, Ford Motors may pay 2 cents for each visitor who views its Mustang demo video on its Mustang web page. Advertisers may also pay for the time a user spends on the site. For example, the advertiser may pay 1 cent per minute spent on the site, and the system may continue to reward users with more Virtual Collectibles the longer the user stays on the site. Other methods include rewarding users for answering questions correctly about a product or service. Here the advertiser may pay 10 cents for each correct answer a user gives, while the system rewards the user with Virtual Collectibles for every correct answer. Lastly, the system may overlay games on top of the site, which users participate in and are rewarded according to their performance. There are various other ways game activities associated with partner sites by the system can be monetized by the system, such as charging a flat fee for any number of rewarded Virtual Collectibles, charging for Virtual Collectibles rewarded during a specific time period, and charging advertisers and partners to customize Virtual Collectibles that are rewarded by the system for activities on their sites In general, promotions manager 314 allows access to, and configuration of promotions, hints, and other content associated with games hosted by the system of the invention in promotions database 318. Moreover, manager 314 can access or store information about games in rules 322. For example, games configured in rules 322 can be associated with a particular promotion stored in promotions database 318. The contents of database 318 is not limited to text, but can include graphical objects similar to or including Virtual Collectibles and/or other web page content such as controls, graphics and text.

Partner access to activities manager 310 and/or promotions manager 314 via port 302 can be provided using well-known web server techniques and web pages and controls, such as Flash, HTML, XML, CGI scripts, Active X, C++, Java, Javascript, and the like. Controls to configure games, prizes and promotions using activities manager 310 and/or promotions manager 314 can further include drop-down lists, text boxes, radio buttons, etc., that are well known to those skilled in the art. Those skilled in the art will be able to understand how to implement such interfaces and controls after being taught by the present disclosure. It should be further noted that in addition or alternatively to providing port 302 for partners, that some or all of the functionality to access, store or configure Virtual Collectibles in database 324, to access, store or configure rules and/or prize criteria and associated Virtual Collectibles in database 322, to access or generate reports from partner activities 320, and to access, store or configure promotions in database 318 can be done manually or through an administrator or other interface.

Certain aspects of games configured and/or accessed by activities manager 310, and promotions configured and/or accessed by manager 314, will be described further in connection with FIGS. 4 to 8. In general, FIGS. 4 to 8 are screenshots illustrating web page and other content served and displayed by server 202 based upon specific selections by users using clients 204, as described in more detail hereinbelow and in the commonly owned patent. Details necessary for an understanding of the present invention will be provided below, while other details provided in the commonly owned patent will be omitted for clarity of the invention.

Figure 4:
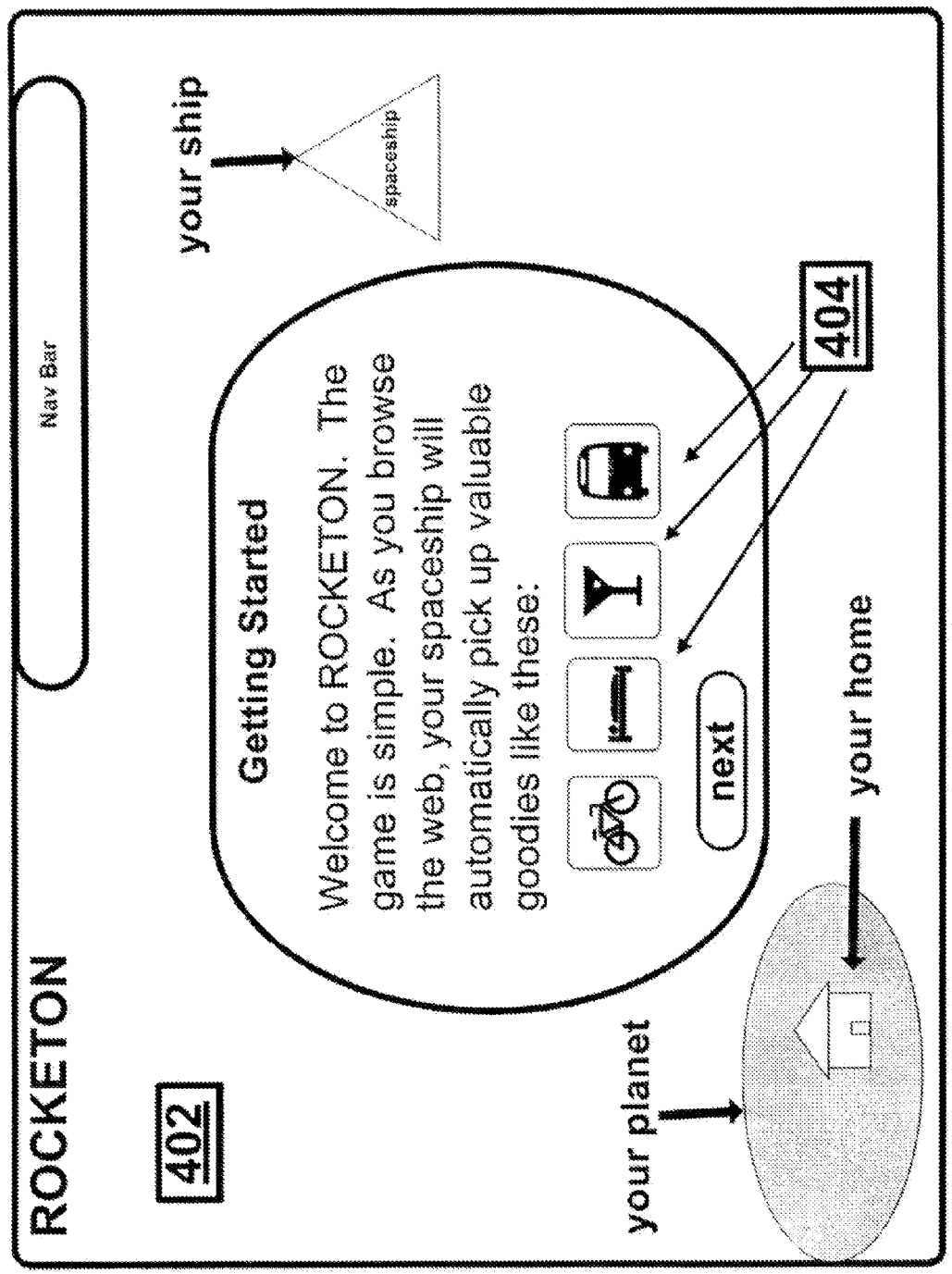

For example, as shown in FIG. 4, promotion manager 314 can cause a game to be announced on a splash page 402 or introduction page when a new member joins the system, or in popup dialogue box appearing on top of any websites, or in other pre-determined situations. In the example game shown in FIG. 4, the game is to collect all three pets in a "Space Pets Combo". These pets are each Virtual Collectibles which can be stored in database 324. An additional prize of "Rocket Dollars," which can be virtual currency or points and/or can be exchanged for real currency or credits, is rewarded for collecting all three pets in the combo. According to aspects of the invention, each of the Virtual Collectibles in the "Space Pets Combo" are associated with specific URLs of websites and/or web pages of partners 230, as configured in game rules 322. It should be noted, that these URLs need not be fixed for all time. Rather, they can be periodically changed and/or rotated among different URLs of partners 230. For example, in one month, the three Virtual Collectibles 404 of the "Space Pets Combo" can be associated with the home pages for www.gap.com, www.ford.com and www.coke.com, thereby driving in-game traffic to those partner sites. In a next month, the same Virtual Collectibles can be associated with the home pages for www.amazon.com, www.yahoo.com and www.nike.com, thereby driving in-game traffic to those partner sites. Accordingly, as users access these home pages as they casually surf the web as usual, they will collect the Virtual Collectibles and when they collect all three, the system will reward them with the prize.

Figure 5:
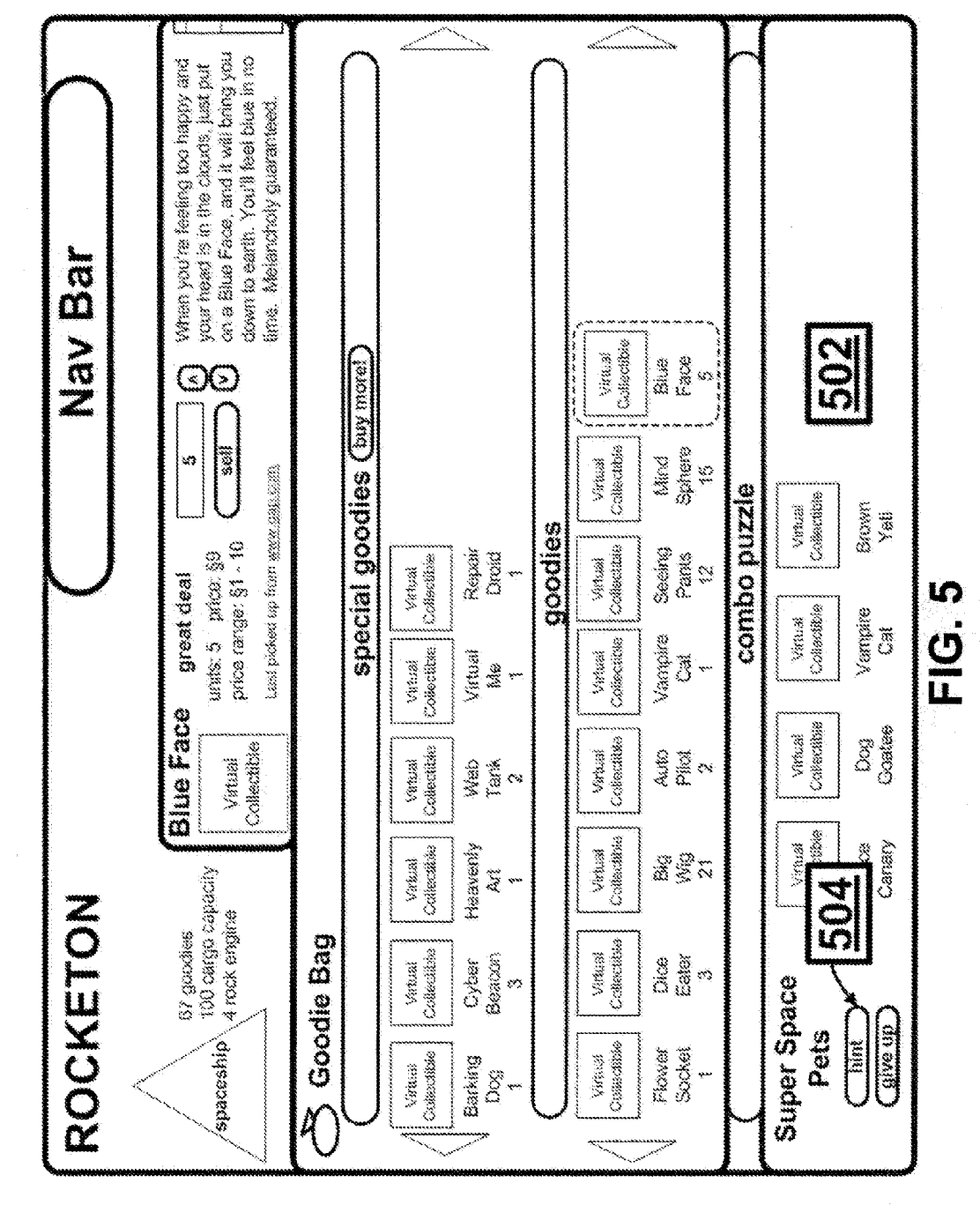

Promotion manager 314 can further cause users to be provided hints or other information regarding their progress in games, and to further drive in-game traffic to partner sites. For example, as shown in FIG. 5, in a screen showing all of the user's Virtual Collectibles, the system can display Virtual Collectibles in connection with a combo game, such as the "Space Pets Combo" described in connection with FIG. 4, in a dedicated pane 502. In this example, additional "Space Pets" Virtual Collectibles that have been collected by the user are also shown in pane 502, even though they are not part of the combo (e.g. the "Brown Yeti" space pet). These additional Virtual Collectibles can be indicated with different colors and/or typefaces, etc., to show that they are not part of the combo. Moreover, Virtual Collectibles that are part of a combo game, but which have not yet been collected, can also be displayed in pane 502 (e.g. the "Space Canary" space pet), but further indicated with different colors and/or typefaces, etc. to show that they have not yet been collected. As further shown in FIG. 5, the pane 502 can further include a "Hint" button. When selected by a user, hints can be provided for finding any uncollected Virtual Collectibles in a combo, thereby helping to drive in-game traffic to partner sites.

FIG. 6 illustrates another example of how games and promotions can be conducted in accordance with aspects of the invention. In this example, a separate news screen can be provided that lists news about various activities hosted by the system, which can include news about promotions and games managed by managers 310, 312 and 314. For example, as shown in FIG. 6, a treasure hunt game and/or treasure hunt hints can be provided in a banner pane 602. This content can be actionable, wherein a user can be provided with additional information about the games and/or hints by clicking on the content. As further shown in FIG. 6, individual news items can be provided in a scrollable window 604. These news items can include information items 606 about games and promotions managed by managers 310, 312 and 314. By clicking on these individual items, users can be provided further information about the promotions and games, such as details about giveaways, and hints for how to find combos or treasure hunt items, for example.

Figure 7:
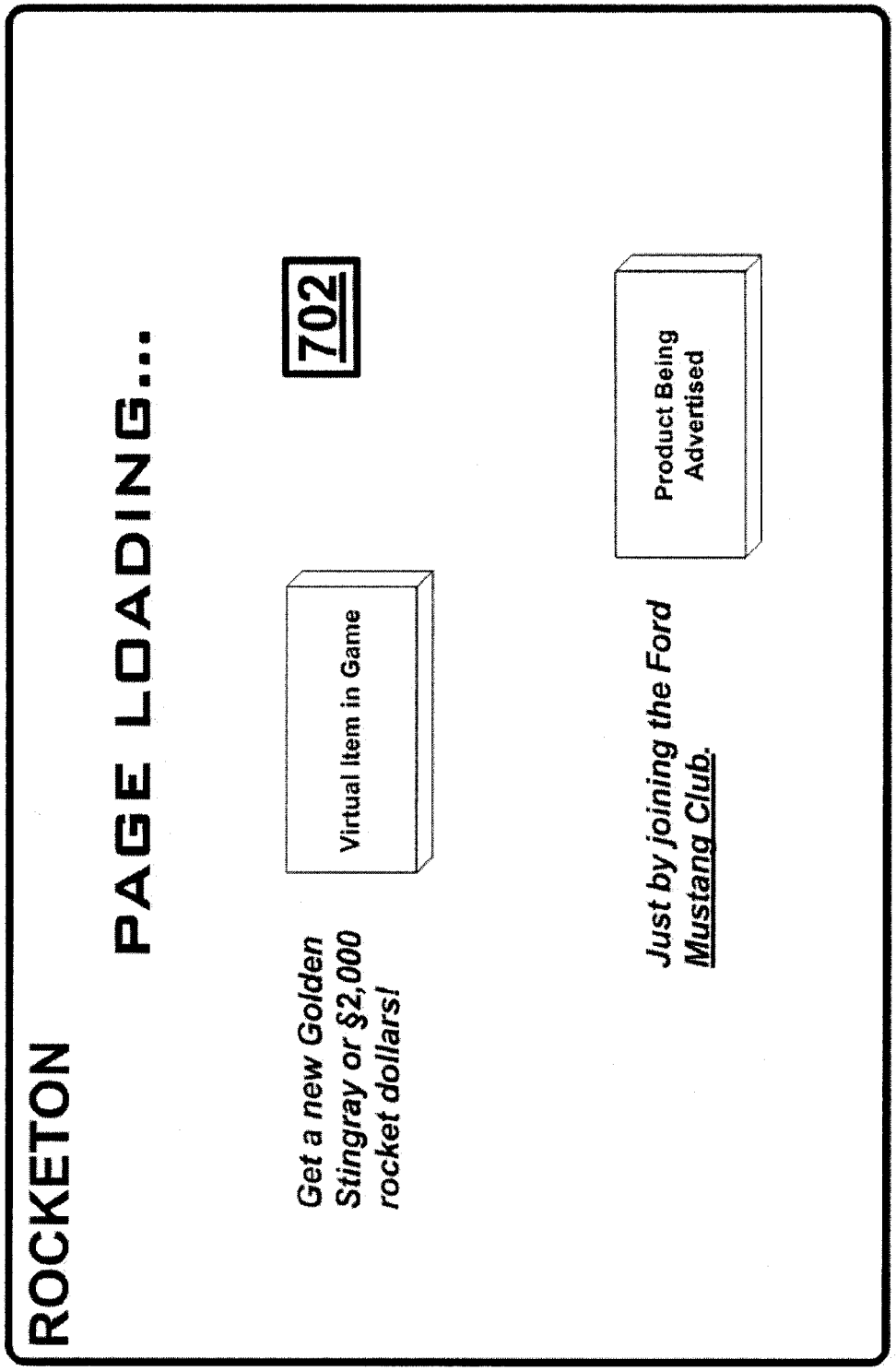

FIG. 7 illustrates further promotional activities that can be provided by the invention. In this example, a splash page or screen 702 provides information about how promotion manager 314 can configure branded Virtual Collectibles (e.g. a Ford branded space ship in this example) that are awarded in connection with a specific promotional give-away (e.g. following a link to a specific URL on a partner site in this example). It should be noted that, in this example, the splash screen is displayed by server 202 when a user enters the system, or in transition between pages displayed by the system. However, this example is not limiting. Moreover, in one example, promotion manager 314 can cause various different promotions stored in database 318 to be displayed on splash screens at various times, so as to drive traffic to various partner sites.

Figure 8:
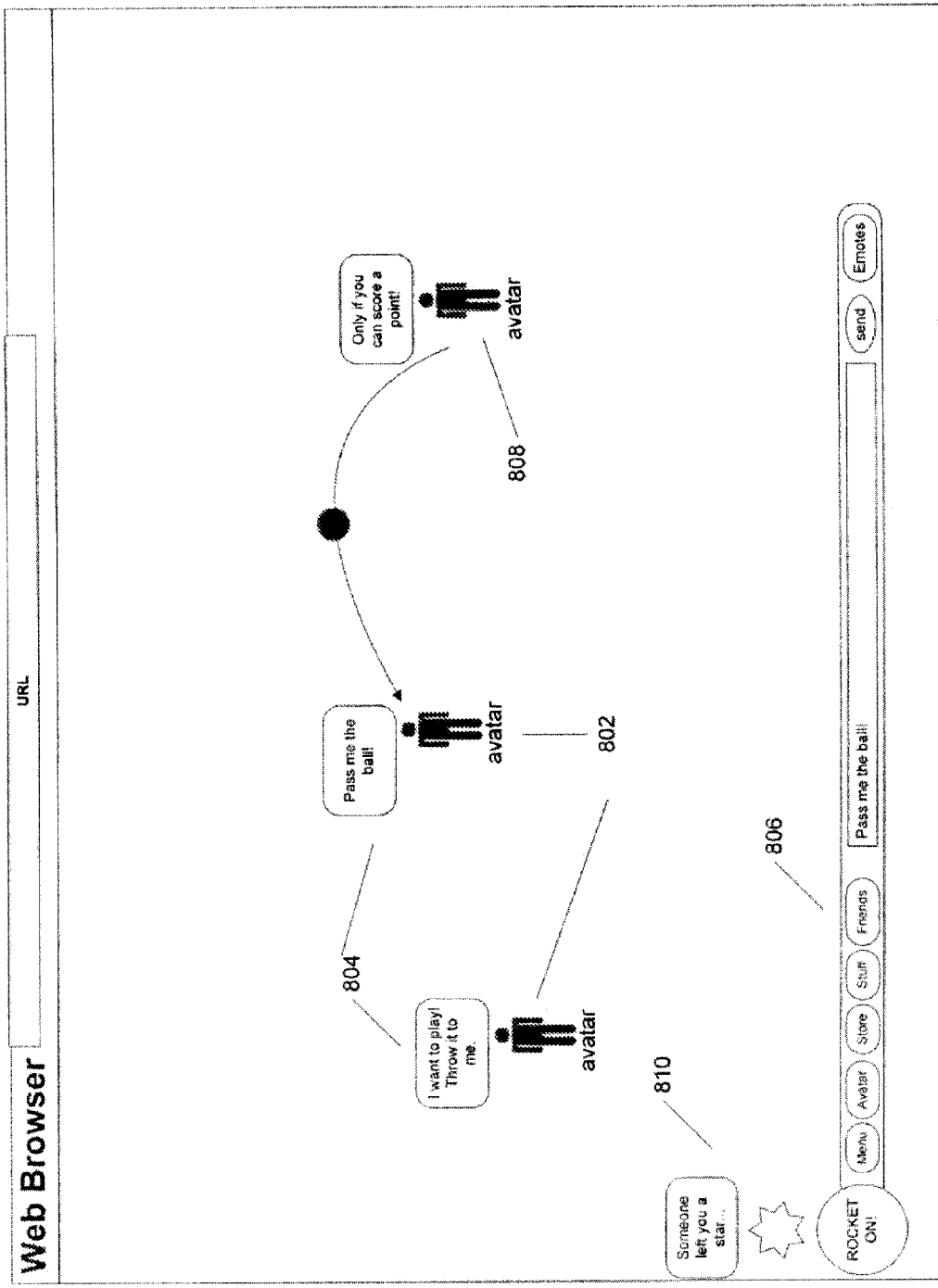

FIG. 8 is a screenshot illustrating a game that can be played according to aspects of the invention. As shown, the game in this example allows users who are visiting a partner site to toss a ball between each other's avatars 802. The users may further chat with each other, and their chat messages can be shown in boxes 804 adjacent to their respective avatars 802, as described in more detail in the commonly owned patent. In this example of an on-line game hosted by the invention, control of the ball is initially controlled by the system, visually represented for example by an avatar 808, which can be automatically generated by the system or controlled by personnel associated with the system or partner sites 230. As further shown in this example, in order to participate in the game (i.e. being able to catch and throw a ball), the user must score a point, which can be related to some on-line activity at the partner site 230, such as filling out a survey or watching a promotional video. The system can monitor the user's on-line activity, and when the required activity has been performed, the user can further participate in the on-line game (i.e. being able to catch and throw a ball, for example by manipulating the avatar's movements and actions). According to further aspects of the invention, the user's activity and game participation can be further tracked and rewarded with a Virtual Collectible, as illustrated in FIG. 8 with message 810.

As further shown, in some embodiments, a navigation bar 806 may also be displayed in which chat messages can be entered and other system controls manipulated, some of which are described in the commonly owned patent.

As set forth above, the invention contemplates different ways the content shown in FIG. 8 can be displayed. In one example, the content of the invention provided by server 202 and received by client 204 overlays other content associated with the website of partners 230 which is normally displayed by a web browser 205 in the conventional manner. In another example, the content is provided within a virtual world associated with the website of partner 230, with the virtual world content completely filling the screen or window of the web browser application. It should be apparent that many other alternatives are possible.

Returning to FIG. 3, and as described in more detail in the commonly owned patent, Virtual Collectibles are stored in database 324 as pointers to one or more objects that may contain animations, sound, graphics and specific functionality within a game or rules-based system. Virtual Collectibles can be as simple as graphics files. For example, a Virtual Collectible could be a .GIF, .JPG, .BMP or .PNG file corresponding to a static image when rendered on a host computer. Virtual Collectibles can further or alternatively include an animation file, such as an animated .GIF file or a Flash animation. Virtual Collectibles can also further or alternatively include any sort of media file, including any type of audio or movie file, such as MP3, .AVI, .SWF, .MPG, WMV, .WAV, etc. In such cases, content associated with Virtual Collectibles can typically be downloaded or streamed to users via port 304 and clients 204 via conventional protocols such as http and rendered on hosts using conventional browser functionality and/or functionality in optional multimedia players such as Flash.

In the present invention, certain game objects (e.g. puzzles, mazes, animations such as weapons or other objects targeted at a user's avatar, etc.) are also stored and maintained in database 324 in much the same manner as Virtual Collectibles and in some respects can be considered Virtual Collectibles themselves. Pointers to these objects can be stored rules 322 and used by manager 312 to control user interactions and experiences within games hosted by the system through port 304. Those skilled in the art will recognize how to implement the games and activities according to the principles of the invention after being taught by the above examples, and the teachings of the commonly owned patent.

It should be noted that server 202 preferably includes an administrator interface (not shown) and associated functionality to manage various aspects and operations of the system. For example, server 202 can allow an administrator to upload and change Virtual Collectibles, their attributes, configure game rules and promotions, and game prizes. Server 202 can further allow an administrator to change and configure web pages and other content served by the http server.

It should be further noted that in alternative embodiments server 202 need not include all the components and functionality shown in FIG. 3, or can include other server and/or network components and functionality not shown in FIG. 3, such as load balancers, firewalls, switches, gateways, etc. Moreover, those skilled in the art will appreciate that server 202 and/or certain or all of the components shown in FIG. 3 can be implemented by several different computers, either locally or remotely located, and communicating with each other via a bus, network, etc. It should be still further noted that server 202 can include functionality described in the above-mentioned commonly owned patent and in co-pending application Ser. No. 12/106,925, the contents of which are incorporated herein by reference, to the extent not detailed herein.

Figure 9:
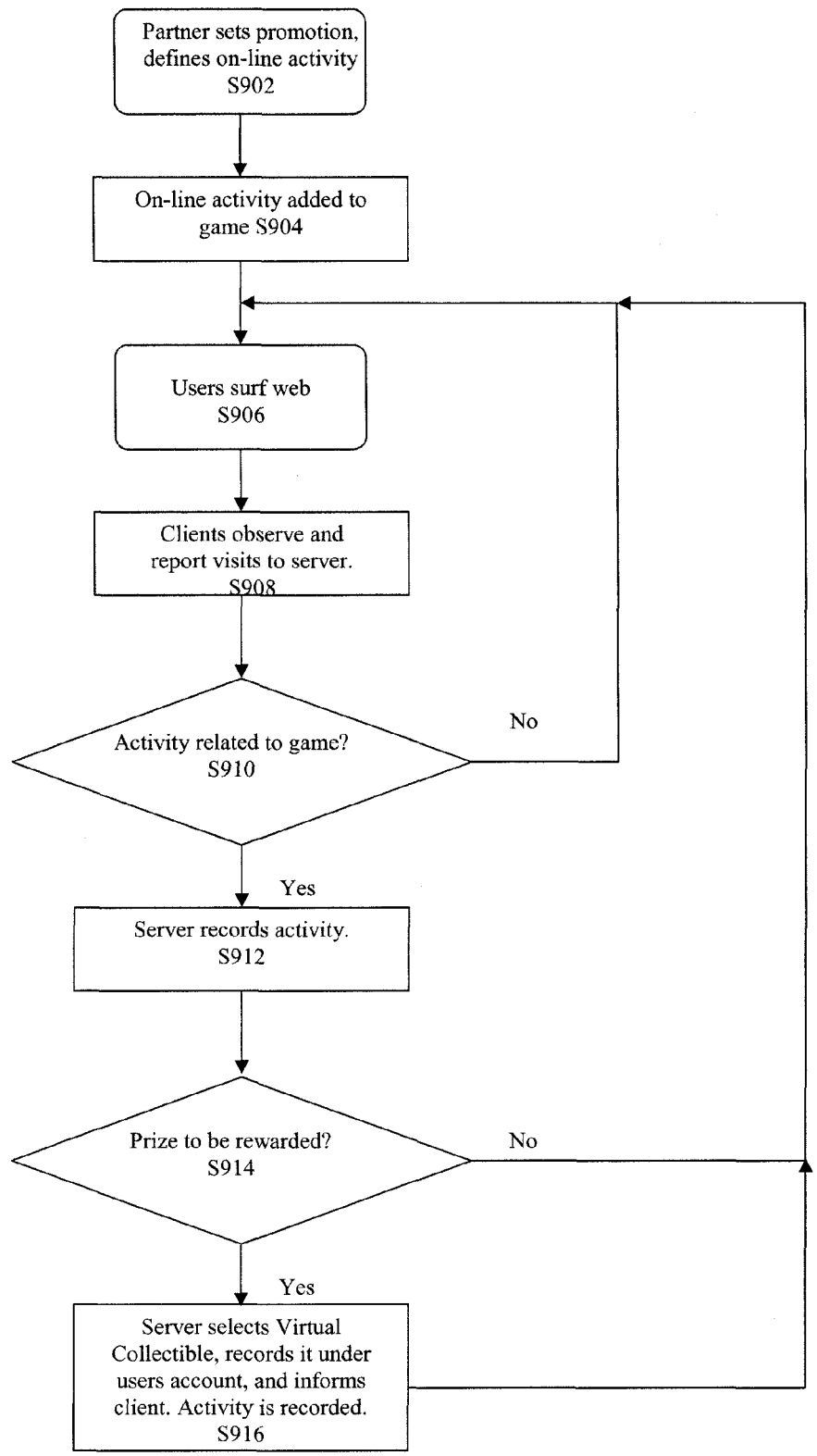
FIG. 9 is a flowchart illustrating an example method for promoting on-line activities using on-line games having prizes such as Virtual Collectibles that can be implemented in a system according to aspects of the invention.

FIG. 9 is a flowchart showing an example process that can be implemented by server 202 to drive on-line traffic to partner sites using Internet-based games according to the invention.

As shown in FIG. 9, in step S902, a partner 230 having an on-line presence such as a web site is desirous of driving a particular type of on-line traffic to its site. The traffic can be general, such as viewing a home page of the site, or it can be highly particularized, such as viewing a demo video or filling out a registration form. The partner specifies this activity, and can further specify any promotional criteria, such as the prize to be offered (e.g. a Virtual Collectible, or a special attribute associated with a Virtual Collectible), a time window, or a limited number available, etc. as described above.

Then in step S904, this desired on-line activity is added to, or used to start, an on-line game hosted by the system of the invention. For example, if the promotion specifies that "Cosmic Sneakers" will be given away to the first 100 visitors on www.nike.com, the system will define a give-away game having similar criteria in rules 322. The system can further add promotional content to be served to users of the system to either explicitly or implicitly inform them of the give-away game. Various other alternatives are possible, depending on the promotion and/or game, including treasure hunts and combo puzzles, and implementation details thereof will become apparent to those skilled in the art after being taught by the present disclosure.

As shown in FIG. 9, in step S906 users having clients 204 surf the web as usual. In step S908, in accordance with predetermined events, such as when a user visits a new URL, the client 204 notes this activity and transmits this information to the server 202. For example, client 204 can monitor whenever a new URL is typed into browser 205, or when a link to a URL having a different domain name than the current page is clicked. The client 204 may also maintain a memory of the last known URL visited and use that to compare to the new URL. The new URL is transmitted by client 204, along with other information such as the user's identity, to port 304 using http methods and TCP sockets, for example. It should be appreciated that this communication can take place without the user's awareness.

In step S910, manager 312 of server 202 determines whether the reported activity is related to one of the games defined in rules 322. For example, manager 312 first compares the URL against URLs listed for games in store 322 to look for a match. If there is a match, processing advances to step S912 where the manager 312 records the activity in database 320. Manager 312 can then provide content to the user associated with the game matching the URL of the website from store 324 and via port 304. Depending on the matching game, examples of which are provided above, this content can include simple text and graphics (e.g. an object that the user can click on) to puzzles, animated interactions of the user's avatar with objects (e.g. sticky goo, weapons fired at the avatar, etc.) and/or with other users' avatars on screen. As further mentioned above, the game content can be embedded within content on the website, it can be overlaid on top of normal website content, or it can be provided within a virtual space associated with the website.

Next, in step S914, manager 312 reviews the prize criteria in the matching rule to determine what, if any, prizes should be rewarded. As set forth above, the prize criteria can include a variety of parameters that are related to on-line activities that the game manager 312 and/or client 204 can monitor. In some games, manager 312 can further retrieve recorded activities in store 320 and/or consult the user's own account information in store 326 to determine whether the prize criteria are met.

If manager 312 in step S914 determines that the criteria for the associated game indicate that a prize including a Virtual Collectible should be awarded to the user, processing advances to step S916.

In step S916, manager 312 retrieves information regarding the associated Virtual Collectible from store 324, and further associates this information in the account for the user in store 326. For example, where the Virtual Collectible is stored as an object in database 324, manager 312 can add a pointer or object ID index to a list of Virtual Collectibles in the user's account information in database 326.

Server 202 (e.g. through port 304) then communicates with client 204 to present the user with the Virtual Collectible and/or the option to accept or reject it. For example, server 202 can send data, text and/or multimedia content to client 204 and client 204 can correspondingly present a message on the host device's output component, such as a computer screen or a cell phone screen, or provide another indicator (e.g. a tone or buzz) indicating that a new Virtual Collectible is available for the user. Note that in some embodiments, the user need not immediately view the Virtual Collectible, although the user can have the option to view the Virtual Collectible by setting the user's preferences accordingly. If a user so chooses, the user can automatically view the Virtual Collectible upon receipt, or in response to a user selection such as a mouse click, etc. The actual processes and mechanisms that are used to enable a user to view and or perceive the Virtual Collectible awarded to the user are described in more detail in the commonly owned patent.

In step S916, server 202 further preferably records the activity leading to the award in store 320. For example, manager 312 can identify and store details regarding the user's game activities in store 320. Manager 312 can further identify and store the number and type of Virtual Collectibles distributed to users for each partner and/or URL, and/or details regarding activities that resulted in each reward, such as the time spent on the site, user browsing patterns, user profiles, user interests, time of day, date, and demographic information, like age, sex and zip code, regarding the user that received the reward.

It should be noted that the games of the present invention can be included in a system described in the commonly owned patent, wherein Virtual Collectibles can be rewarded to users automatically, without regard to any prize criteria. Accordingly, even when detected on-line activity in step S808 is not related to a game defined in rules 322, additional or alternative processing can be performed to determine whether a Virtual Collectible can be distributed to the user.

It should be apparent that the invention thus can effectively drive traffic and promote on-line activities to partners who advertise and promote their goods and services via the Internet. Meanwhile, in addition to allowing users to be entertained by receiving a Virtual Collectible merely by surfing the web at their own leisure, the companies associated with the online activities performed by the user, and for which the user was rewarded with a Virtual Collectible, can be positively remembered by the user. Still further, based on the experience of receiving a Virtual Collectible at the company's web site, the user may be more inclined to (a) visit the company's web site often, and (b) purchase goods or services from the company.

The example implementations described above should be considered illustrative rather than limiting, and many combinations, divisions, deletions, alterations and supplementations even within the above described implementations are possible, as should become apparent to those skilled in the art.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. A method, comprising the following computer-implemented steps:
    providing, by one or more computers, an on-line virtual world that is accessible to users having respective web browsers via the Internet;
    allowing a first one of the users to configure an avatar that the user can control via the user's respective web browser to interact with other content in the on-line virtual world;

establishing a game that is playable in the on-line virtual world, the game having associated game content in the on-line virtual world, an associated prize and associated prize reward criteria;

configuring a rarity of the prize, the rarity defining additional criteria for limiting a number of the prize that can be rewarded;

receiving, from the user's respective web browser, information regarding the user's participation in the game, the participation including the user's control of the avatar's interaction with the associated game content;

determining from the information whether the user has satisfied the associated prize reward criteria;

further determining from the information whether the user satisfies the additional criteria;

rewarding the user with the prize only if the user has satisfied both the associated prize reward criteria and the additional criteria.

2. A method according to claim 1, wherein in a first configuration of the game the method further comprises:

causing the game content to be embedded together with the separate content displayed by the web browser application.

3. A method according to claim 2, wherein in a second confirmation of the game the method further comprises:

causing the game content to be displayed in a full screen provided by the web browser application.

4. A method according to claim 1, wherein the prize includes a virtual collectible for accessorizing the avatar.

5. A method according to claim 1, wherein the host comprises a cellular phone.

6. A method according to claim 1, wherein the additional criteria includes a fixed quantity of the prize.

7. A method according to claim 1, wherein the additional criteria includes a required combination of the prize with other virtual collectibles possessed by the user.

8. A method according to claim 1, wherein the game content includes content that allows the first user to control interactions with an avatar with a second one of the users.

* * * * *